UNITED STATES PATENT OFFICE.

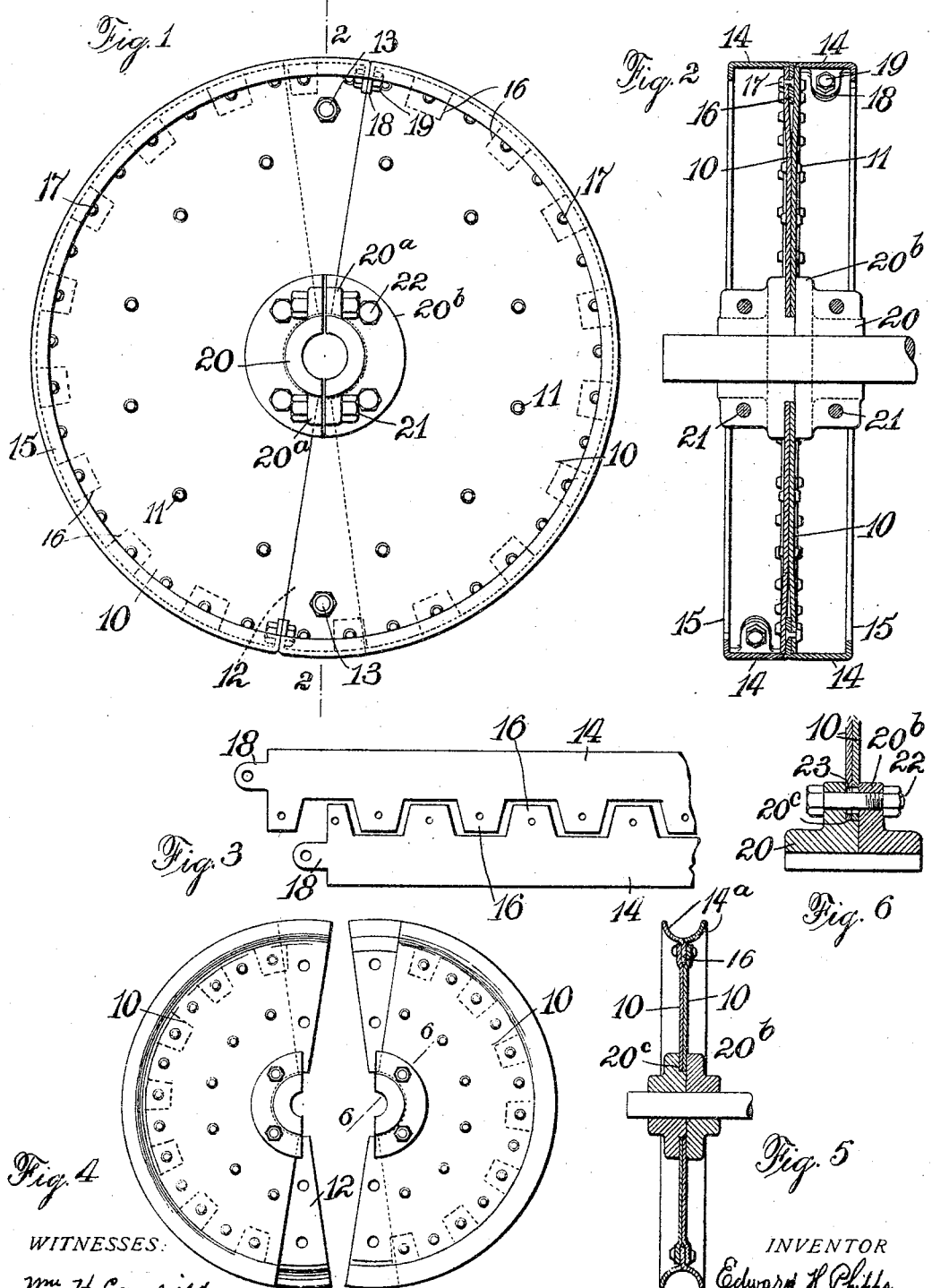

EDWARD H. PHIPPS, OF NEW YORK, N. Y.

SPLIT PULLEY.

No. 807,125.  Specification of Letters Patent.  Patented Dec. 12, 1905.

Application filed November 5, 1904. Serial No. 231,526.

*To all whom it may concern:*

Be it known that I, EDWARD H. PHIPPS, of New York, county of Kings, and State of New York, have invented a new and Improved Split Pulley, of which the following is a full, clear, and exact description.

My invention relates to improvements in metallic split pulleys; and the object of my invention is to produce a light, yet strong and simple, pulley which can be conveniently put together, which can be easily and securely applied to a shaft, and which has its meeting portions constructed so as to overlap and interlock and form a secure connection, making the pulley as strong as a solid pulley.

Another object of my invention is to construct the pulley so that it can be readily separated into halves and leave the whole or a part of the hub on a portion of the pulley, and also to make the rims in such a way that their meeting portions shall interlock and clamp together, so as to render the union exceptionally secure.

My invention is also intended to produce a simple split metallic pulley having means whereby the pulleys proper of different diameters can have a certain uniform central bore which will enable them to be attached to hubs of varying sizes, thus rendering it easy to apply any requisite pulley to any ordinary size of shaft.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of the pulley embodying my invention. Fig. 2 is a cross-section on the line 2 2 of Fig. 1. Fig. 3 is a developed plan of a part of the pulley-rim, showing the interlocking parts before they are bent to shape. Fig. 4 is a side elevation of the pulley as adapted for rope transmission and with the parts separated. Fig. 5 is a cross-section of the structure as shown in Fig. 4, and Fig. 6 is a detail section on the line 6 6 of Fig. 4.

The body of the pulley is made by cutting through their centers two disks or circular sheets of metal, making four equal halves 10. These halves are riveted together by the rivets 11 or equivalent fastenings and form the disk of the pulley, as shown. Before the half-disks are fastened together, however, they are slightly skewed, so that their edges are out of parallel, thus forming overlapping webs 12, which while overlapping do not produce any bulge in the pulley, and these parts can be secured together by suitable fastenings, such as bolts 13, and when secured it will be seen that while the webs 12 overlap the edges of the half-disks on each side of the pulley-center abut, and so the union is very secure.

The rims 14 of the pulley are made in half-sections on each side of the center, making four similar half-sections, which when united form two halves of the rims, as shown, and these sections have preferably, though not necessarily, inturned strengthening-flanges 15 at their outer edges, while their inner edges are formed into interlocking teeth 16, which are bent inward at right angles to the face of the rim-sections 14, and thus interlock between the disk-sections 10, as shown clearly in Fig. 2. The teeth 16 in their interlocked position are then fastened to the parts 10 by rivets 17 or equivalent fastenings. Obviously the parts 16 can be made of any suitable shape so long as they interlock as described. The ends of the sections 14 terminate in suitable ears 18, (see Figs. 2 and 3,) and these are bent at right angles to the rims, as shown clearly in Figs. 1 and 2, and are fastened together by bolts 19 or other suitable means. Owing to the skewing of the parts 10, the disk-sections 14 on opposite sides of the pulley-center break joints, as shown clearly in Fig. 1, and thus an additional strengthening of the pulley is secured.

The hubs of the wheel are made to separate at points diametrically opposite, as shown clearly in Fig. 1, and on a line midway of the webs 12 to facilitate the separation and fastening and general handling of the pulley. Like the other parts of the pulley the hub is made up of four quarter-sections 20, so that there are two similar parts on each side or end of the pulley, and these sections 20 have flanges 20$^a$ to receive bolts 21, by which they are fastened together, and they have also circumferential flanges 20$^b$, which are clamped to the disk portions 10, as shown clearly in Fig. 2, and which are held together and to the disks by fastening-bolts 22. The flanges 20$^b$ on one side of the pulley are preferably cut away, as shown at 20$^c$, so that the disk-sections 10 can fit nicely in the recess and permit the hub-sections forming opposite ends of the pulley to abut, as shown in Fig. 6, and in the same figure it will be noticed that the disks 10 have slightly-enlarged holes 23 to receive the fastening-bolts 22. This provides for any slight necessary movement of the disks 10 in relation to the hubs and bolts, so that the disks may not be distorted in fastening them to the hubs and to a shaft.

From the foregoing description it will be seen that by taking out the bolts 13, 21, and 19 the pulley can be easily separated diametrically, and it will be seen, further, that by removing a pair of bolts 22 the whole hub can be left, if desired, on one half-section of the pulley.

In practice the pulleys of various sizes can be provided with a central bore of uniform size, while various hubs adapted to fit shafts of different sizes can be used on any one of said pulleys, and so the pulleys are easily applied to any ordinary shaft.

In securing the pulley to the shaft any usual means can be adopted and the pulley can be clamped, keyed, or set skewed, as desired.

It will be noticed in the drawings that I have shown a pulley provided with a flat face and with a concave face for rope transmission; but it will be understood that the face of a pulley can be given any usual or desired shape.

Having thus fully described my invention, I claim as new and desire to secure by Letters Patent—

1. In a split pulley, the rim comprising opposed sections having their meeting side edges formed into interlocking parts extending radially inward, and means for securing the parts together.

2. A split pulley having a suitable body portion, and a rim formed of interlocking inwardly-extending parts, the said parts being rigidly secured to the body portion of the pulley.

3. In a pulley, the combination with a body portion, of the rim formed of interlocking inwardly-extending parts, the said parts being rigidly secured to the body portion.

4. A split pulley, comprising a body portion, and a separate rim portion fastened to the body portion, the said rim portion being formed of sections having radial interlocking parts along their meeting side edges.

5. A split pulley comprising a separable disk-body, and a rim formed of opposed sections secured to the body, the rim having meeting interlocking parts along the edges of the sections and having the end portions of the rim-sections bent inward and adapted to be secured together.

6. A split pulley, comprising two essentially half-sections, each formed of half-disks of metal sheets, fastened together, the disks of each half being slightly skewed, split hubs attached to the pulley-sections, and rims having inturned lugs along their meeting edges, the said lugs being rigidly fastened between the disk portions of the pulley.

7. A split pulley, comprising a longitudinally and diametrically separable hub, a body formed of similar half portions secured to the hub, each half portion comprising a pair of half-disks skewed slightly in relation to each other, means for fastening the sections of the pulley-body and hub together, and a rim formed of opposed similar sections, the meeting edges of which have interlocking and radially-extending lugs which are held between the disk portions of the pulley.

EDWARD H. PHIPPS.

Witnesses:
WARREN B. HUTCHINSON,
WM. H. CAMFIELD.